(12) United States Patent
Groewe et al.

(10) Patent No.: US 9,061,571 B2
(45) Date of Patent: Jun. 23, 2015

(54) METHOD FOR CONTROLLING A MOTORIZED FLAP ARRANGEMENT OF A MOTOR VEHICLE

(71) Applicant: Brose Fahrzeugteile GmbH & Co., KG, Hallstadt, Hallstadt (DE)

(72) Inventors: Christian Groewe, Cologne (DE); Dirk Hellmich, Duisberg (DE); Juergen Eggeling, Muelheim an der Ruhr (DE); Klaus Duenne, Ratingen (DE)

(73) Assignee: BROSE FAHRZEUGTEILE GMBH & CO. KG, HALLSTADT, Hallstadt (DE)

( * ) Notice: Subject to any disclaimer, the term of this patent is extended or adjusted under 35 U.S.C. 154(b) by 173 days.

(21) Appl. No.: 13/930,633

(22) Filed: Jun. 28, 2013

(65) Prior Publication Data

US 2014/0000166 A1   Jan. 2, 2014

(30) Foreign Application Priority Data

Jul. 2, 2012   (DE) .......................... 10 2012 013 067

(51) Int. Cl.
| | |
|---|---|
| *B60R 22/00* | (2006.01) |
| *E05F 15/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60J 5/10* | (2006.01) |
| *E05F 15/40* | (2015.01) |
| *E05F 15/611* | (2015.01) |

(52) U.S. Cl.
CPC .............. *B60J 5/101* (2013.01); *E05Y 2400/30* (2013.01); *E05Y 2400/32* (2013.01); *E05Y 2400/456* (2013.01); *E05Y 2800/748* (2013.01); *E05Y 2900/546* (2013.01); *E05Y 2900/50* (2013.01); *E05F 15/40* (2015.01); *E05F 15/611* (2015.01)

(58) Field of Classification Search
CPC combination set(s) only.
See application file for complete search history.

(56) References Cited

U.S. PATENT DOCUMENTS 5,369,342 A * 11/1994 Rudzewicz et al. ........... 318/102
6,225,769 B1 * 5/2001 Brenner et al. ............... 318/434

FOREIGN PATENT DOCUMENTS

| DE | 10225887 | 1/2004 |
|---|---|---|
| DE | 102008042183 | 3/2010 |
| DE | 102009047441 | 6/2011 |

\* cited by examiner

*Primary Examiner* — Rami Khatib
(74) *Attorney, Agent, or Firm* — Pauly, DeVries, Smith & Deffner, LLC

(57) ABSTRACT

The invention relates to a method for controlling a motorized flap, wherein the flap arrangement comprises a flap which may be a pivotable flap, a drive arrangement associated with the flap and a control arrangement associated with the drive arrangement, wherein the deflection of the flap is limited in at least one first direction of movement, by a mechanical end stop on the motor vehicle side, wherein the motorized flap movement in the first direction of movement is limited by means of the control arrangement by an end stop provided by control technology, in order to prevent the flap from running in a motorized manner in the first direction of movement into the mechanical end stop.

18 Claims, 1 Drawing Sheet

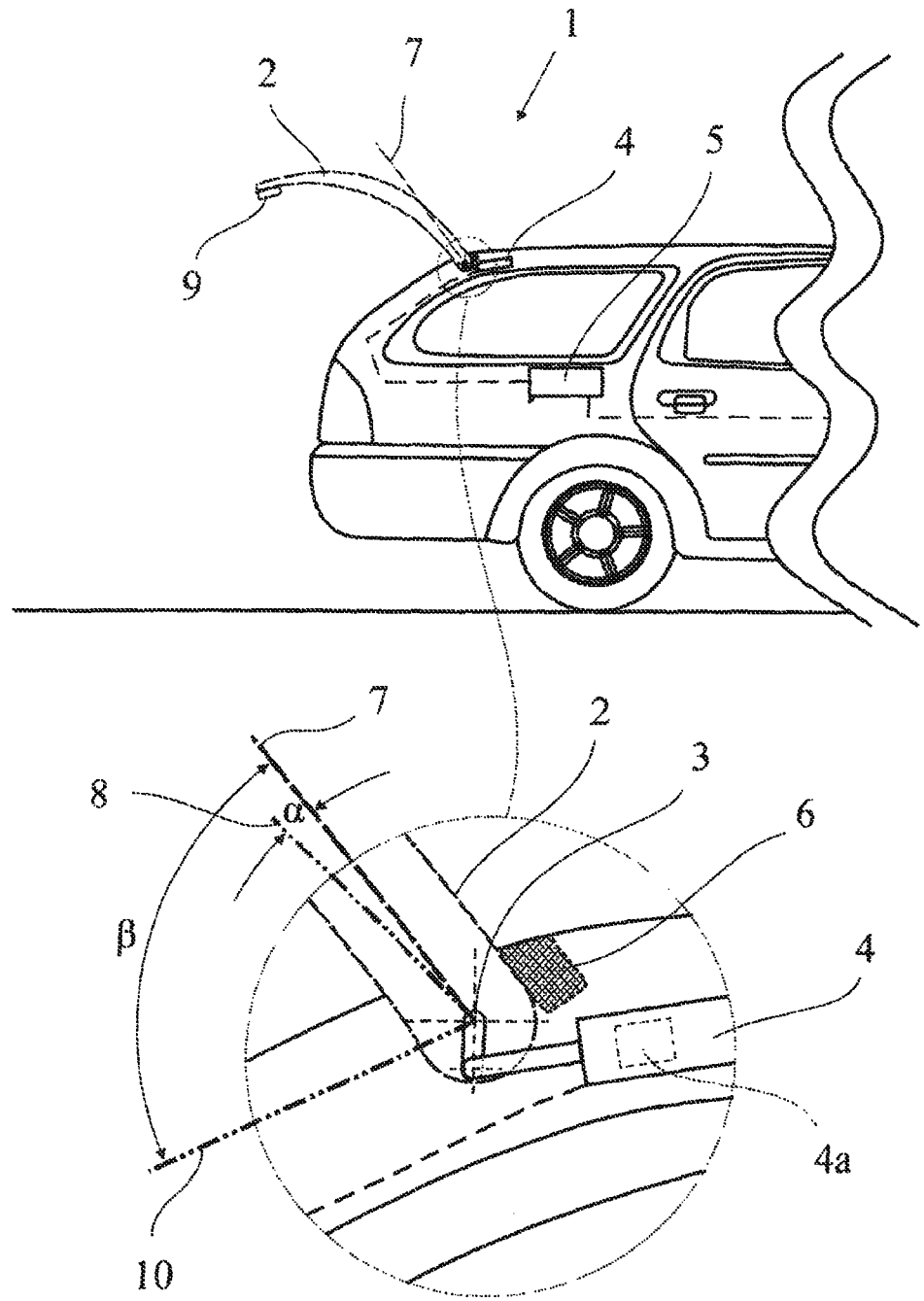

US 9,061,571 B2

METHOD FOR CONTROLLING A MOTORIZED FLAP ARRANGEMENT OF A MOTOR VEHICLE

CLAIM OF PRIORITY

This application claims the benefit of German Patent Application No. DE 10 2012 013 067.8, filed Jul. 2, 2012, the disclosure of which is incorporated by reference herein in its entirety.

FIELD OF THE INVENTION

The invention relates to a method for controlling a motorized flap arrangement of a motor vehicle.

BACKGROUND

The comfort function of the motorized adjustment of a flap of a motor vehicle has become established commercially in recent years. In principle, said comfort function may be applied to all types of flaps. Accordingly, the term "flap" in the present case is to be understood as all-encompassing. Included within this term are tailgate flaps, boot lids, engine bonnets, doors, side doors, luggage compartment floors or the like of a motor vehicle. A flap in the present case may be provided with a pivotable or displaceable flap leaf.

A known tailgate flap arrangement (DE 102 25 887 A1), on which the invention is based, is provided with a pivotable tailgate flap as well as with a drive arrangement associated with the tailgate flap and a control arrangement associated with the drive arrangement.

With the motorized deflection of flaps it always has to be taken into account that the maximum capacity for deflection in the opening direction is limited by mechanical means. This limitation is generally implemented by a mechanical end stop on the motor vehicle side.

In order to avoid excessive loading of the flap kinematics during the motorized adjustment thereof, generally an end stop is provided by control technology, which provides a corresponding limitation of the motorized flap movement by control technology. Viewed from the closed position, the position of the end stop provided by control technology is located at a defined distance upstream of the position of the mechanical end stop.

The end stop provided by control technology is calibrated in the factory. When calibrating the end stop provided by control technology, two boundary conditions have to be considered. On the one hand, the end stop provided by control technology should be placed as close as possible to the mechanical end stop in order to provide the greatest possible deflection of the flap in normal operational use. On the other hand, a sufficient distance from the mechanical end stop has to be maintained in order to prevent the tailgate flap arrangement from running into the mechanical end stop, irrespective of the respective operating mode.

In view of the fact that a tailgate flap arrangement is subjected to specific manufacturing tolerances and, during the motorized adjustment of a tailgate flap, generally a certain tensioning occurs involving further geometric shifts, an automated calibration of the end stop provided by control technology is a requirement.

SUMMARY

The object of the invention is to specify a method for controlling a motorized flap arrangement of a motor vehicle in which an automated calibration of the end stop provided by control technology is possible with high operational reliability and at low cost.

The above object is achieved in a method for controlling a motorized flap arrangement of a motor vehicle, wherein the flap arrangement comprises a flap which may be deflected, in particular a pivotable flap, a drive arrangement associated with the flap and a control arrangement associated with the drive arrangement, wherein the deflection of the flap is limited in at least one first direction of movement, in particular in the opening direction, by a mechanical end stop on the motor vehicle side, wherein the motorized flap movement in the first direction of movement is limited by means of the control arrangement by an end stop provided by control technology, in order to prevent the flap from running in a motorized manner in the first direction of movement into the mechanical end stop, wherein for calibrating the end stop provided by control technology, the flap arrangement is moved by motor, by means of the control arrangement, in a blocking movement into the mechanical end stop and subsequently released, and moved by motor in at least one subsequent blocking movement into the mechanical end stop and subsequently released and in that the deflection of the flap, present after the last release of tension, is detected by means of the control arrangement as a basis for determining the position of the end stop provided by control technology.

Essential to the invention is the principal observation of determining the position of the end stop provided by control technology by using the mechanical end stop. To this end, the flap arrangement is initially moved by motor in a first blocking movement into the mechanical end stop and then released again. If the deflection present after the release of tension were able to be reproduced, this deflection could be detected and used for determining the position of the end stop provided by control technology.

However, the above-mentioned blocking movement into the mechanical end stop is, in principle, associated with the tensioning of the flap arrangement, followed by a pivoting-back of the flap when the tension of the flap arrangement is subsequently released. If the kinetic energy of the flap has reached a certain level during the blocking movement, the pivoting-back and thus the detected deflection is almost irreproducible. Thus, the proposed solution provides that the flap arrangement is moved by motor in at least one subsequent blocking movement into the mechanical end stop and then released and that the deflection of the flap present after the last release, i.e. after releasing the last blocking movement, is detected by means of the control arrangement as a basis for determining the position of the end stop provided by control technology.

The proposed solution provides the possibility of being able to automate the calibration in which uncontrolled pivoting-back when the flap arrangement is released is able to be avoided in a particularly simple manner. This is achieved by not just one, but at least two, blocking movements being provided.

In the at least one subsequent blocking movement, the kinetic energy of the flap is preferably reduced, which is associated with a reduction in the tensioning and an increase in the reproducibility when determining the end stop provided by control technology. The result is a relatively accurate and reproducible detection of a flap deflection located upstream of the mechanical end stop, which is able to serve as a basis for determining the end stop provided by control technology.

In a particularly preferred embodiment, the release of the flap arrangement which follows the impact with the mechanical end stop comprises braking of the flap movement by means of the control arrangement. Also, the influence of the release of the flap arrangement on the measurement result may be effectively reduced. In an embodiment, the braking takes place via short-circuit braking which in the known manner primarily reduces rapid movements, in particular the aforementioned pivoting-back movement.

The braking of the flap movement during the release of the flap arrangement is a subject of further teaching of the invention.

With regard to the further teaching of the invention, it should be noted that in the present case it does not necessarily involve a blocking movement carried out at least twice. Moreover, reference should be made to all the embodiments of the aforementioned teaching of the invention.

According to the further teaching of the invention, a control arrangement is claimed for carrying out one of the two proposed methods. Reference should also be made to the embodiments of the proposed methods.

In an embodiment, the invention provides for a method for controlling a motorized flap arrangement of a motor vehicle, wherein the flap arrangement comprises a flap which may be deflected, in particular a pivotable flap, a drive arrangement associated with the flap and a control arrangement associated with the drive arrangement,
wherein the deflection of the flap is limited in at least one first direction of movement, in particular in the opening direction, by a mechanical end stop on the motor vehicle side, wherein the motorized flap movement in the first direction of movement is limited by means of the control arrangement by an end stop provided by control technology, in order to prevent the flap from running in a motorized manner in the first direction of movement into the mechanical end stop, wherein for calibrating the end stop provided by control technology, the flap arrangement is moved by motor, by means of the control arrangement, in a blocking movement into the mechanical end stop and subsequently released, and moved by motor in at least one subsequent blocking movement into the mechanical end stop and subsequently released and in that the deflection of the flap, present after the last release of tension, is detected by means of the control arrangement as a basis for determining the position of the end stop provided by control technology.

In one embodiment, the deflection of the flap, present after the last release of tension, is detected by means of the control arrangement and stored as the position of the end stop provided by control technology, or that the deflection of the flap present after the last release of tension is detected by means of the control arrangement and is stored as the position of the end stop provided by control technology, minus the difference in deflection.

In one embodiment, a subsequent blocking movement immediately follows the previous blocking movement chronologically or relative to the flap deflection.

In one embodiment, a subsequent blocking movement is undertaken at one or more of the following: reduced speed, reduced drive force, and reduced drive power, compared with the respective previous blocking movement.

In one embodiment, each blocking movement is undertaken at one or more of the following: reduced speed, reduced drive force, and reduced drive power, compared with a flap movement in normal operation.

In one embodiment, in the course of the blocking movements in each case the impact with the mechanical end stop is detected by means of the control arrangement and then the release of tension of the flap arrangement is activated.

In one embodiment, the release of tension of the flap arrangement comprises one or more of the following: switching off the drive arrangement and reducing the current applied to the drive arrangement by means of the control arrangement.

In one embodiment, the release of tension of the flap arrangement comprises braking of the flap movement by means of the control arrangement.

In one embodiment, the drive arrangement comprises at least one electrical drive motor, and that the braking of the flap movement during the course of the release of tension of the flap arrangement is undertaken via short-circuit braking of the at least one drive motor by means of the control arrangement.

In one embodiment, the calibration of the end stop provided by control technology is activated cyclically during normal operational use by means of the control arrangement, or the calibration of the end stop provided by control technology is activated during normal operational use by means of the control arrangement when a manual flap movement on the part of the user beyond the position of the end stop provided by control technology is detected.

In one embodiment, a sensor for detecting a drive variable, in particular a position sensor for a drive shaft or the like, is associated with the control arrangement, from which a measurement of the flap deflection is determined or that a flap sensor for detecting the flap deflection is associated with the control arrangement.

In one embodiment, the flap arrangement has a motor vehicle lock which holds the flap in a main closed position.

In one embodiment, the motorized flap movement in normal operation may be limited in the first direction of movement by means of the control arrangement to a maximum operational deflection which is able to be adjusted, in particular controlled by the user, and which, viewed from the closed position, is located upstream of the position of the end stop provided by control technology.

In an embodiment the invention provides for a method for controlling a motorized flap arrangement of a motor vehicle, wherein the flap arrangement comprises a flap which may be deflected, in particular a pivotable flap, a drive arrangement associated with the flap and a control arrangement associated with the drive arrangement,
wherein the deflection of the flap is limited in at least one first direction of movement, in particular in the opening direction, by a mechanical end stop on the motor vehicle side, wherein the motorized flap movement in the first direction of movement is limited by means of the control arrangement by an end stop provided by control technology, in order to prevent the flap from running in a motorized manner in the first direction of movement into the mechanical end stop, wherein for calibrating the end stop provided by control technology, the flap arrangement is moved by motor, by means of the control arrangement, in a blocking movement into the mechanical end stop and then released, and in that during the release of tension of the flap arrangement the flap movement is braked by means of the control arrangement.

In an embodiment the invention provides for a control arrangement for carrying out a method for controlling a motorized flap arrangement of a motor vehicle, wherein the flap arrangement comprises a flap which may be deflected, in particular a pivotable flap, a drive arrangement associated with the flap and a control arrangement associated with the drive arrangement, wherein the deflection of the flap is limited in at least one first direction of movement, in particular in the opening direction, by a mechanical end stop on the motor vehicle side, wherein the motorized flap movement in the first direction of movement is limited by means of the control arrangement by an end stop provided by control technology, in order to prevent the flap from running in a motorized manner in the first direction of movement into the mechanical end stop, wherein for calibrating the end stop provided by control technology, the flap arrangement is moved by motor, by means of the control arrangement, in a blocking movement into the mechanical end stop and then released, and in that during the release of tension of the flap arrangement the flap movement is braked by means of the control arrangement.

In one embodiment, the control arrangement provides collision detection with regard to a flap movement and in that the impact with the mechanical end stop is detected via the collision detection of the control arrangement.

In one embodiment, the flap arrangement has a motor vehicle lock which holds the flap in a main closed position and in a pre-closed position, that reaching a closed position is detected by means of the control arrangement via the motor vehicle lock.

In one embodiment, reaching a closed position is used by the control arrangement for determining a reference flap deflection.

BRIEF DESCRIPTION OF THE FIGURES

The invention is described in more detail hereinafter with reference to the following drawing showing an example implementation:

FIG. 1 shows the rear region of a motor vehicle with a flap arrangement forming the basis of the proposed method, said flap arrangement being provided with a similarly proposed control arrangement.

DETAILED DESCRIPTION

The flap arrangement 1 shown in the drawing is a tailgate flap arrangement which is correspondingly provided with a tailgate flap 2. With regard to the broad understanding of the term "flap", reference should be made to the introductory part of the description. Accordingly, all the following embodiments of a tailgate flap apply equally to all other types of flap mentioned there.

The tailgate flap 2 in this case and preferably is pivotable about a flap axis 3. A displaceable flap 2 is also conceivable.

In the known manner, a drive arrangement 4 and a control arrangement 5 associated with the drive arrangement 4 are associated with the flap 2. The control arrangement 5 is generally coupled via a BUS system, in particular via a CAN-BUS, to a subordinate control unit or the like.

The deflection of the flap 2 is limited in at least one first direction of movement, in this case in the opening direction, by a mechanical end stop 6 on the motor vehicle side. A corresponding deflection 7 of the flap 2 is assigned to the mechanical end stop 6, which in the figure is indicated as the angular position of the flap 2 relative to the flap axis 3.

The motorized flap movement in the first direction of movement, in this case in the opening direction, is limited by means of the control arrangement 5 by an end stop provided by control technology. The position 8 of the end stop provided by control technology is located, viewed from the closed position, upstream of the position 7 of the mechanical end stop 6. By means of the end stop provided by control technology, the flap 2 is prevented from running in a motorized manner in the first direction of movement, in this case in the opening direction, into the mechanical end stop 6, and thus generating undesired mechanical loading of the flap arrangement 1.

The term "mechanical end stop" is to be understood in a broad sense here. All mechanical measures which lead to a mechanical blocking of the flap 2 are to be encompassed thereby. In particular, all "soft" end stops are also grouped together under this term.

The same applies to the term "end stop provided by control technology" which is also to be interpreted broadly. All measures provided by control technology which lead to braking with subsequent stopping of the flap movement are encompassed therein. An end stop which is physically present is naturally not required here.

Initially, it is essential to the invention that for calibrating the end stop provided by control technology, the flap arrangement 1 is moved by motor, by means of the control arrangement 5, in a blocking movement into the mechanical end stop 6 and subsequently released. In the drawing, this means that the flap 2 is moved by motor to the right, until the flap 2 runs into the mechanical end stop 6 before being blocked. This is identified in a manner to be explained further by means of the control arrangement 5. Subsequently, the control arrangement 5 activates the release of the flap arrangement 1, preferably by the current to the drive arrangement 4 being switched off The calibration is preferably undertaken from the closed position 10 of the flap 2, and travels with corresponding kinematic energy into the mechanical end stop 6, which leads to the tensioning of the flap arrangement 1 explained further above. Accordingly, during this first blocking movement, considerable pivoting-back of the flap 2 has to be taken into account.

It is also essential to the invention that at least one subsequent blocking movement is provided in which the flap arrangement 1 is again moved into the mechanical end stop 6 and subsequently released again.

It is proposed that the deflection of the flap 2, present after the last release of tension, is detected by means of the control arrangement 5 as a basis for determining the position 8 of the end stop provided by control technology. The position 8 of the end stop provided by control technology is finally stored in the control arrangement 5, whereby the calibration of the end stop provided by control technology is complete.

In principle, the deflection of the flap 2, present after the last release of tension, may be stored in the same manner as the position 8 of the end stop provided by control technology. Preferably, however, only the most significant position 8 is calculated from this deflection. In the simplest case, the deflection of the flap 2 after the last release of tension is stored as the position 8 of the end stop provided by control technology, minus the difference in deflection. Other ways of determining the position 8 of the end stop provided by control technology are conceivable.

The proposed solution is particularly effective when a subsequent blocking movement immediately follows the previous blocking movement chronologically and/or relative to the flap deflection. Assuming that the control parameters are identical for all blocking movements, the aforementioned pivoting-back of the flap 2 during the release of tension would continuously reduce with every blocking movement, which increases the reproducibility of the determination of the position 8 of the end stop provided by control technology. The reason for this is that, due to the increasingly shorter acceleration path from one blocking movement to the next blocking movement, a corresponding reduction in the kinematic energy of the flap 2 has to be taken into account.

Alternatively or additionally, the pivoting-back may be reduced such that a subsequent blocking movement is undertaken at reduced speed and/or reduced drive force and/or reduced drive power, compared with the previous blocking movement. Ultimately, this means that less drive energy is converted into elastic energy corresponding to the tensioning of the flap arrangement 1, which in turn leads to the aforementioned pivoting-back of the flap 2.

In principle, it is to be recommended that each blocking movement is undertaken at reduced speed and/or reduced drive force and/or reduced drive power, compared with a flap movement in normal operation which exclusively serves for motorized opening or closing of the flap 2. In this case, it may also be provided that by means of the control arrangement 5 initially the flap is moved at high speed into a region located upstream of the mechanical end stop 6. The actual blocking movement may then take place at a correspondingly reduced speed or the like.

As mentioned above, the control arrangement 5 detects the impact with the mechanical end stop 6 in the course of the blocking movements, whereupon the release of tension of the flap arrangement 1 is activated by means of the control arrangement 5. Advantageously, the control arrangement 5 provides collision detection with regard to a flap movement, which is also used for detecting the impact with the mechanical end stop 6. The dual use of the collision detection leads to an arrangement which is particularly simple to implement, both in terms of hardware technology and software technology.

Reference has already been made to the fact that the release of tension of the flap arrangement 1 during the course of a blocking movement may comprise switching off the drive arrangement 4. Alternatively or additionally, however, it may be provided that the release of tension merely comprises reducing the current applied to the drive arrangement 4 by means of the control arrangement 5.

In order to reduce the above pivoting-back of the flap 2 during the release of tension, it is further preferably provided that the release of tension of the flap arrangement 1 comprises braking of the flap movement by means of the control arrangement 5. In the event that the drive arrangement 4 is an electrical drive arrangement 4 having at least one electrical drive motor, the braking of the flap movement may be undertaken via short-circuit braking of the at least one drive motor by means of the control arrangement 5. In this case, it is particularly advantageous that a separate braking device does not have to be provided.

In specific applications, it may be sufficient to carry out the calibration of the end stop provided by control technology once, namely in the factory. Due to the geometric shifts which may result from different loading situations, from temperature fluctuations or the like, however, it is recommended to activate the calibration cyclically during normal operational use by means of the control arrangement 5. The cyclical calibration may be carried out at specific time intervals, after the completion of a predetermined number of opening and/or closing movements or at the usual motor vehicle maintenance intervals.

Alternatively or additionally, it may be provided that the calibration of the end stop provided by control technology is activated during normal operational use by means of the control arrangement 5 when a manual flap movement on the part of the user beyond the position 8 of the end stop provided by control technology is detected by means of the control arrangement 5. If the user adjusts the flap 2 beyond the position 8 of the end stop provided by control technology, therefore, a further calibration would be undertaken. This is appropriate as in this case there is a high probability that the position 8 of the end stop provided by control technology is too far away from the position 7 of the mechanical end stop 6. As mentioned above, this would lead to the resulting flap opening being smaller than would actually be possible.

To determine the deflection of the flap 2, numerous variants are conceivable. In a particularly preferred embodiment, it is provided that a sensor 4a for detecting a drive variable, in this case and preferably a position sensor 4a for a drive shaft or the like, is associated with the control arrangement 5, from which a measurement of the flap deflection may be determined by means of the control arrangement 5. It is understood here that the measurement of the flap deflection may be any value which characterizes the deflection of the flap 2. In the simplest case, this measurement may be an angular measurement relative to a reference deflection, in particular the closed position 10 of the flap 2. However, it is also conceivable for a flap sensor for detecting the flap deflection to be associated with the control arrangement 5. Such a flap sensor may, for example, be arranged on the flap axis 3 of the flap 2.

The flap arrangement 1 shown has, in a conventional manner per se, a motor vehicle lock 9 which holds the flap 2 in a main closed position and optionally in a pre-closed position located upstream of the main closed position. Depending on the embodiment, it may be provided here that the adjustment from the pre-closed position into the main closed position is undertaken by a so-called closing aid.

In a preferred variant, it is significant that reaching a closed position is detected by means of the control arrangement 5 via the motor vehicle lock 9, wherein reaching the closed position is further preferably used by the control arrangement 5 for determining a reference flap deflection 10. In this case, the motor vehicle lock 9 is provided in a similarly conventional manner with the closing elements, a latch and pawl, wherein the latch is able to be brought into a main latching position and/or pre-latching position corresponding to the main closed position and/or pre-closed position and may be blocked there by the pawl. Reaching the respective closed position may be detected by corresponding sensors inside the motor vehicle lock 9.

In principle, it is conceivable that specific boundary conditions do not permit a complete opening of the flap 2. This is the case, for example, when the motor vehicle is parked in a garage with reduced ceiling height. In this connection, reference should be made to the German patent application DE 10 2011 018 849.5 of 27 Apr. 2011, which refers back to the applicant and the contents thereof are fully included in the subject-matter of the present application.

In a particularly preferred embodiment, the motorized flap movement in normal operation may be limited in the first direction of movement, in this case the opening direction, by means of the control arrangement 5 to a maximum operating deflection, which in this case is able to be adjusted, preferably controlled by the user, and which, viewed from the closed position, is located upstream of the position 8 of the end stop provided by control technology. In addition to the end stop provided by control technology, therefore, there is the possibility of limiting the maximum deflection—maximum operational deflection—by control technology for the motorized flap movement in normal operation. In this case, it is provided in the simplest case to store the maximum operational deflection in addition to the position 8 of the end stop provided by control technology in the control arrangement 5.

It is, however, also conceivable that the position 8 of the end stop provided by control technology is able to be altered, in particular controlled by the user. For example, it may be provided that the end stop provided by control technology is calibrated in the factory and that an alteration of the end stop provided by control technology may be undertaken subsequently, controlled by the user. In this case, it is preferable that an alteration to the end stop provided by control technology is possible exclusively in the closing direction in order to prevent the flap 2 running into the mechanical end stop 6 during the motorized flap movement.

According to further teaching of the invention which also has an independent meaning, a further method for controlling a motorized flap arrangement 1 of a motor vehicle is claimed. In this case, it is essential that, during the aforementioned release of tension of the flap arrangement 1 in the course of a blocking movement, the flap movement is braked by means of the control arrangement 5. In this further teaching of the invention, it is not necessarily the case that a blocking movement which is carried out at least twice is provided. Reference should also be made to all embodiments of the aforementioned teaching of the invention.

According to further teaching of the invention which also has an independent meaning, a control arrangement 5 for carrying out at least one of the two proposed methods is claimed. In this regard, reference should also be made to all of the above embodiments for the two proposed methods, provided these embodiments are suitable for describing the control arrangement 5.

The invention claimed is:

1. A method for controlling a motorized flap arrangement of a motor vehicle, wherein the flap arrangement comprises a flap which may be deflected, in particular a pivotable flap, a drive arrangement associated with the flap and a control arrangement associated with the drive arrangement,
   wherein the deflection of the flap is limited in at least one first direction of movement, in particular in the opening direction, by a mechanical end stop on the motor vehicle side,
   wherein the motorized flap movement in the first direction of movement is limited by means of the control arrangement by an end stop provided by control technology, in order to prevent the flap from running in a motorized manner in the first direction of movement into the mechanical end stop,
   wherein for calibrating the end stop provided by control technology, the flap arrangement is moved by motor, by means of the control arrangement, in a blocking movement into the mechanical end stop and subsequently released, and moved by motor in at least one subsequent blocking movement into the mechanical end stop and subsequently released and in that the deflection of the flap, present after the last release of tension, is detected by means of the control arrangement as a basis for determining the position of the end stop provided by control technology.

2. The method according to claim 1, wherein the deflection of the flap, present after the last release of tension, is detected by means of the control arrangement and stored as the position of the end stop provided by control technology, or that the deflection of the flap present after the last release of tension is detected by means of the control arrangement and is stored as the position of the end stop provided by control technology, minus the difference in deflection.

3. The method according to claim 1, wherein a subsequent blocking movement immediately follows the previous blocking movement chronologically or relative to the flap deflection.

4. The method according to claim 1, wherein a subsequent blocking movement is undertaken at one or more of the following: reduced speed, reduced drive force, and reduced drive power, compared with the respective previous blocking movement.

5. The method according to claim 1, wherein each blocking movement is undertaken at one or more of the following: reduced speed, reduced drive force, and reduced drive power, compared with a flap movement in normal operation.

6. The method according to claim 1, wherein in the course of the blocking movements in each case the impact with the mechanical end stop is detected by means of the control arrangement and then the release of tension of the flap arrangement is activated.

7. The method according to claim 6, wherein the control arrangement provides collision detection with regard to a flap movement and in that the impact with the mechanical end stop is detected via the collision detection of the control arrangement.

8. The method according to claim 1, wherein the release of tension of the flap arrangement comprises one or more of the following: switching off the drive arrangement and reducing the current applied to the drive arrangement by means of the control arrangement.

9. The method according to claim 1, wherein the release of tension of the flap arrangement comprises braking of the flap movement by means of the control arrangement.

10. The method according to claim 9, wherein the drive arrangement comprises at least one electrical drive motor, and that the braking of the flap movement during the course of the release of tension of the flap arrangement is undertaken via short-circuit braking of the at least one drive motor by means of the control arrangement.

11. The method according to claim 1, wherein the calibration of the end stop provided by control technology is activated cyclically during normal operational use by means of the control arrangement, or the calibration of the end stop provided by control technology is activated during normal operational use by means of the control arrangement when a manual flap movement on the part of the user beyond the position of the end stop provided by control technology is detected.

12. The method according to claim 1, wherein a sensor for detecting a drive variable, in particular a position sensor for a drive shaft or the like, is associated with the control arrangement, from which a measurement of the flap deflection is determined or that a flap sensor for detecting the flap deflection is associated with the control arrangement.

13. The method according to claim 1, wherein the flap arrangement has a motor vehicle lock which holds the flap in a main closed position.

14. The method according to claim 1, wherein the motorized flap movement in normal operation may be limited in the first direction of movement by means of the control arrangement to a maximum operational deflection which is able to be adjusted, in particular controlled by the user, and which, viewed from the closed position, is located upstream of the position of the end stop provided by control technology.

15. The method according to claim 1, wherein the flap arrangement has a motor vehicle lock which holds the flap in a main closed position and in a pre-closed position, that reaching a closed position is detected by means of the control arrangement via the motor vehicle lock.

16. The method according to claim 15, wherein reaching a closed position is used by the control arrangement for determining a reference flap deflection.

17. A method for controlling a motorized flap arrangement of a motor vehicle, wherein the flap arrangement comprises a flap which may be deflected, in particular a pivotable flap, a drive arrangement associated with the flap and a control arrangement associated with the drive arrangement, wherein the deflection of the flap is limited in at least one first direction of movement, in particular in the opening direction, by a mechanical end stop on the motor vehicle side, wherein the motorized flap movement in the first direction of movement is limited by means of the control arrangement by an end stop provided by control technology, in order to prevent the flap from running in a motorized manner in the first direction of movement into the mechanical end stop, wherein for calibrating the end stop provided by control technology, the flap arrangement is moved by motor, by means of the control arrangement, in a blocking movement into the mechanical end stop and then released, and in that during the release of tension of the flap arrangement the flap movement is braked by means of the control arrangement.

18. A control arrangement for carrying out a method for controlling a motorized flap arrangement of a motor vehicle, wherein the flap arrangement comprises a flap which may be deflected, in particular a pivotable flap, a drive arrangement associated with the flap and a control arrangement associated with the drive arrangement, wherein the deflection of the flap is limited in at least one first direction of movement, in particular in the opening direction, by a mechanical end stop on the motor vehicle side, wherein the motorized flap movement in the first direction of movement is limited by means of the control arrangement by an end stop provided by control technology, in order to prevent the flap from running in a motorized manner in the first direction of movement into the mechanical end stop, wherein for calibrating the end stop provided by control technology, the flap arrangement is moved by motor, by means of the control arrangement, in a blocking movement into the mechanical end stop and then released, and in that during the release of tension of the flap arrangement the flap movement is braked by means of the control arrangement.

* * * * *